United States Patent
Kanno (10) Patent No.: US 6,987,376 B2
(45) Date of Patent: Jan. 17, 2006

(54) WATERCRAFT BATTERY CONTROL SYSTEM

(75) Inventor: Isao Kanno, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/273,895

(22) Filed: Oct. 17, 2002

(65) Prior Publication Data
US 2003/0076071 A1    Apr. 24, 2003

(30) Foreign Application Priority Data
Oct. 24, 2001   (JP)  ............................ 2001-326814

(51) Int. Cl.
H02J 7/00  (2006.01)
F02D 41/00 (2006.01)

(52) U.S. Cl. ................................. 320/132; 123/339.15

(58) Field of Classification Search ............... 320/128, 320/132, 134, 117; 123/73 AD, 196 S, 335, 123/406.74, 339.15; 340/618, 620, 984; 184/103.1; 75/290, 293; 440/1, 87; 180/65.2
See application file for complete search history.

(56) References Cited

U.S. PATENT DOCUMENTS

| | | |
|---|---|---|
| 4,492,197 A | 1/1985 | Yamamoto et al. |
| 4,594,978 A | 6/1986 | Kanno |
| 4,708,669 A | 11/1987 | Kanno et al. |
| 4,759,731 A | 7/1988 | Uchida et al. ................. 440/1 |
| 4,767,363 A | 8/1988 | Uchida et al. ................. 440/1 |
| 4,788,014 A | 11/1988 | Kanno |
| 4,822,307 A | 4/1989 | Kanno |
| 4,850,906 A | 7/1989 | Kanno |
| 4,898,132 A | 2/1990 | Kanno |
| 4,913,108 A | 4/1990 | Sougawa et al. |
| 4,931,025 A | 6/1990 | Torigai et al. ................. 440/1 |
| 4,989,575 A | 2/1991 | Kanno |
| 5,020,492 A | 6/1991 | Kanno |
| 5,069,174 A | 12/1991 | Kanno |
| 5,070,840 A | 12/1991 | Kanno et al. |
| 5,109,192 A | 4/1992 | Kanno |
| 5,117,792 A | 6/1992 | Kanno |
| 5,125,382 A | 6/1992 | Kanno et al. |
| 5,136,279 A | 8/1992 | Kanno |
| 5,144,300 A * | 9/1992 | Kanno ....................... 340/984 |
| 5,175,481 A | 12/1992 | Kanno |
| 5,230,643 A | 7/1993 | Kanno |

(Continued)

FOREIGN PATENT DOCUMENTS

JP     59134027     *   8/1984

(Continued)

OTHER PUBLICATIONS

NMEA 2000; Standard for Serial Data Networking of Marine Electronic Devices; Main Document; Version 1.000, Sep. 12, 2001; @NMEA 1999, 2000, 2001.

(Continued)

*Primary Examiner*—Pia Tibbits
(74) *Attorney, Agent, or Firm*—Knobbe, Martens, Olson & Bear, LLP (57) ABSTRACT

A watercraft battery control system monitors a battery charge. The system informs the watercraft operator when the battery charge is below a predetermined value. Alternatively, the system automatically controls engine operation by starting the engine or by increasing the speed of the engine to allow a generator to replenish the battery charge when the battery charge has fallen below a predetermined value. By informing the user of an inadequate battery charge, the user can start the engine an recharge the battery. Alternatively, the system automatically maintains the battery at a predetermined charge level to ensure safe and enjoyable watercraft operation.

19 Claims, 8 Drawing Sheets

U.S. PATENT DOCUMENTS

| | | | |
|---|---|---|---|
| 5,233,282 A * | 8/1993 | Iwashita | 320/117 |
| 5,245,324 A | 9/1993 | Jonker et al. | 345/440.1 |
| 5,283,548 A | 2/1994 | Kanno | |
| 5,295,877 A | 3/1994 | Kanno | |
| 5,352,138 A | 10/1994 | Kanno | |
| 5,366,394 A | 11/1994 | Kanno | |
| 5,481,261 A | 1/1996 | Kanno | |
| 5,555,857 A * | 9/1996 | Kanno | 123/73 |
| 5,582,149 A * | 12/1996 | Kanno | 123/406.74 |
| 5,586,535 A | 12/1996 | Syomura | 123/352 |
| 5,606,952 A | 3/1997 | Kanno et al. | |
| 5,615,645 A | 4/1997 | Kanno | |
| 5,633,573 A * | 5/1997 | van Phuoc et al. | 320/128 |
| 5,685,802 A * | 11/1997 | Kanno | 477/111 |
| 5,687,694 A | 11/1997 | Kanno | 123/479 |
| 5,730,243 A * | 3/1998 | Koike et al. | 180/220 |
| 5,819,864 A * | 10/1998 | Koike et al. | 180/65.1 |
| 5,903,215 A | 5/1999 | Kanno | |
| 5,941,745 A | 8/1999 | Kanno | |
| 6,015,319 A | 1/2000 | Tanaka | 440/84 |
| 6,107,779 A * | 8/2000 | Hara et al. | 320/132 |
| 6,109,986 A | 8/2000 | Gaynor et al. | 440/87 |
| 6,141,608 A | 10/2000 | Rother | 701/33 |
| 6,213,820 B1 | 4/2001 | Kanno | |
| 6,276,472 B1 * | 8/2001 | Takashima et al. | 180/65.2 |
| 6,286,492 B1 | 9/2001 | Kanno | |
| 6,325,046 B1 | 12/2001 | Kanno | |
| 6,357,423 B1 | 3/2002 | Kanno | |
| 6,375,525 B1 | 4/2002 | Kanno | |
| 6,377,879 B2 | 4/2002 | Kanno | |
| 6,415,766 B1 | 7/2002 | Kanno et al. | 123/339.19 |
| 6,425,362 B1 | 7/2002 | Kanno | |
| 6,453,897 B1 | 9/2002 | Kanno | |
| 6,470,852 B1 | 10/2002 | Kanno | |
| 6,474,298 B2 | 11/2002 | Kanno | |
| 6,484,693 B1 | 11/2002 | Kanno | |
| 6,491,032 B1 | 12/2002 | Kanno | |
| 6,494,188 B1 | 12/2002 | Kanno | |
| 6,508,680 B2 | 1/2003 | Kanno | |
| 6,520,147 B1 | 2/2003 | Kanno | |
| 6,520,167 B1 | 2/2003 | Kanno | |
| 6,525,508 B1 | 2/2003 | Kanno | |
| 6,526,946 B1 | 3/2003 | Kanno | |
| 6,568,372 B1 | 5/2003 | Kanno | |
| 6,582,261 B2 | 6/2003 | Kanno | |
| 6,595,179 B1 | 7/2003 | Kanno | |
| 6,612,881 B2 | 9/2003 | Kanno | |
| 6,626,154 B1 | 9/2003 | Kanno | |
| 6,648,706 B2 | 11/2003 | Kanno | |
| 6,672,283 B2 | 1/2004 | Kanno | |
| 6,712,651 B2 | 3/2004 | Kanno | |
| 6,713,934 B2 | 3/2004 | Kanno | |
| 6,722,333 B2 | 4/2004 | Kanno et al. | |
| 6,752,672 B2 | 6/2004 | Kanno | |
| 6,872,106 B2 | 3/2005 | Kanno | |

FOREIGN PATENT DOCUMENTS

| | | | |
|---|---|---|---|
| JP | 01-112397 | | 5/1989 |
| JP | 06-200822 | | 7/1994 |
| JP | 06189402 | * | 7/1994 |
| JP | 09170931 | * | 6/1997 |
| JP | 09170936 | * | 6/1997 |
| JP | 11103505 | * | 4/1999 |
| JP | 2000298494 | * | 10/2000 |
| JP | 2000347618 | * | 12/2000 |

OTHER PUBLICATIONS

NMEA 2000; Standard for Serial Data Networking of Marine Electronic Devices; Appendix A; Version 1.000; Sep. 12, 2001; @NMEA 1999, 2000, 2001.

NMEA 2000; Standard for Serial Data Networking of Marine Electronic Devices; Appendix B; @NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Date Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783-5 Network Management.

NMEA 2000; Standard for Serial Data Networking of Marine Electronic Devices; Appendix F; ISO 11783-3 DataLink Layer.

NMEA 2000; Standard for Serial Data Networking of Marine Electronic Devices; Appendix G; ISO 11898 Controller Area Network.

* cited by examiner

WATERCRAFT BATTERY CONTROL SYSTEM

PRIORITY INFORMATION

This application is based on and claims priority under 35 U.S.C. §119 to Japanese Patent Application No. 2001-326814, filed on Oct. 24, 2001, the entire contents of which are hereby expressly incorporated by reference herein.

BACKGROUND OF THE INVENTION

1. Field of the Invention

The invention relates to a watercraft battery control system for monitoring a battery charge. The system informs the watercraft operator when the battery charge is below a predetermined value and automatically starts the engine to allow a generator to replenish the battery charge when the battery charge has fallen below a predetermined value.

2. Description of the Related Art

Watercraft (e.g., personal watercraft or boats) typically incorporate internal combustion engines along with propulsion units to provide power and propel the watercraft in a variety of popular applications. The internal combustion engines can operate according to the two-cycle (two-stroke) operating principle or the four-cycle (four-stroke) operating principle. Outboard motors are being manufactured in larger sizes to meet higher power demands from watercraft operators. The cranking torques required to start these large displacement engines, especially four-cycle engines, have become too large to allow such engines to be started by hand. Cold weather also increases engine-starting torque by affecting the viscosity of the lubricating oil. A high torque starter motor that receives electrical power from a battery is therefore necessary to start the watercraft engines.

A battery is essential for operating the watercraft, and since the amount of power consumed is larger for a starter than for the other electrical components, the remaining charge of the battery needs to be maintained at a relatively high level. If the remaining charge of the battery is low, the electrically operated starter cannot start the engine.

A typical watercraft is equipped with a number of power-consuming parts or devices that can be actuated even when the engine is stopped, for example, when the watercraft is anchored at sea. Therefore, it is possible that the remaining charge of the battery will be dissipated without the operator becoming aware that the battery is being almost discharged. For example, when power is consumed for roughly five hours at 7 amperes, the remaining charge of a typical battery can be insufficient to start an engine. A five-hour-power-consumption period is not uncommon on watercraft, especially during offshore fishing activities or when using the watercraft for recreation without the engine running.

One way to prevent an untimely shortage of battery charge is to provide two batteries for the watercraft. One battery is used exclusively for starting the engine, and the other battery is used to provide power to other electrical devices. Some systems use two batteries that are arranged to be switchable to ensure sufficient power to always start the engine. However, in such systems, the batteries can be falsely switched, which may cause a shortage in the charge of the battery that is intended to provide power to start the engine.

SUMMARY OF THE INVENTION

It is an object of this invention to provide a watercraft battery control system to prevent the dissipation of the remaining charge in a battery to reduce or eliminate problems in engine starting.

One aspect of an embodiment in accordance with the present invention is a watercraft battery control system for monitoring a battery charge. The system informs the watercraft operator when the battery charge is below a predetermined value, and the system automatically starts the engine to cause a generator to replenish the battery charge when the battery charge has fallen below a predetermined value.

One aspect in accordance with embodiments of the present invention is a watercraft battery monitoring system that comprises an integrating unit that integrates the current extracted from a battery and the current provided to a battery to provide a net integrated current value. A charge determining unit is responsive to the net integrated current value and determines whether a remaining charge in the battery is less than a predetermined value. An alarm unit is responsive to the charge determining unit to output a perceptible alarm when the charge determining unit determines that the remaining charge in the battery is less than the predetermined value. In particular, embodiments, the perceptible alarm is visual. Alternatively, the perceptible alarm is audible. As a further alternative, the perceptible alarm is both audible and visual.

Another aspect in accordance with embodiments of the present invention is a watercraft battery monitoring system that comprises an integrating unit that integrates the current extracted from a battery and the current provided to a battery to provide a net integrated current value. A charge determining unit is responsive to the net integrated current value to determine whether a remaining charge in the battery is less than a first predetermined value. An engine control unit is responsive to the charge determining unit to automatically start an engine when the charge determining unit determines that the charge in the battery is less than the first predetermined value. The engine is coupled to a generator that provides electrical current to charge the battery to a charge level greater than the first predetermined value. Preferably, the charge determining unit also determines whether the remaining charge of the battery is greater than a second predetermined value, and the engine control unit is responsive to the charge determining unit to automatically stop the engine when the charge determining unit determines that the charge in the battery is greater than the second predetermined value. Also, preferably, the watercraft battery monitoring system further comprises an input unit that receives an input by an operator to set or reset an automatic start enable command. A storage unit receives the input and stores a value representing whether the automatic start enable command is set or reset. The engine control unit is responsive to the value representing the automatic start enable command in the storage unit to automatically start the engine only when the automatic start enable command is set.

Another aspect in accordance with embodiments of the present invention is a watercraft battery monitoring system that comprises an integrating unit that integrates the current extracted from a battery and the current provided to a battery to provide a net integrated current value. A charge determining unit is responsive to the net integrated current value to determine whether a remaining charge in the battery is less than a first predetermined value. An engine control unit is responsive to the charge determining unit to automatically increase a speed of an engine from an initial engine speed to an increased engine speed when the charge determining unit determines that the charge in the battery is less than the first predetermined value and the engine control unit determines that the engine is already running. The engine is coupled to a generator that provides electrical current to charge the battery to a charge level greater than the first predetermined value. Preferably, the charge determining unit also determines whether the remaining charge of the battery is greater than a second predetermined value, and the engine control unit is responsive to the charge determining unit to automatically reduce the engine speed from the increased engine speed to the initial engine speed when the charge determining unit determines that the charge in the battery is greater than the second predetermined value. Also preferably, the watercraft battery monitoring system further comprises an input unit that receives an input by an operator to set or reset an automatic speed control enable command. A storage unit receives the input and stores a value representing whether the automatic speed control enable command is set or reset. The engine control unit is responsive to the value representing the automatic speed control enable command in the storage unit to automatically increase the speed of the engine only when the automatic speed control enable command is set.

Another aspect in accordance with embodiments of the present invention is a watercraft battery monitoring system that comprises an integrating unit that integrates the current extracted from a battery and the current provided to a battery to provide a net integrated current value. A charge determining unit is responsive to the net integrated current value to determine whether a remaining charge in the battery is less than a first predetermined value. An engine control unit is responsive to the charge determining unit to automatically start an engine when the charge determining unit determines that the charge in the battery is less than the first predetermined value and the engine control unit determines that the engine is stopped. The engine is coupled to a generator that provides electrical current to charge the battery to a charge level greater than the first predetermined value. The engine control unit is further responsive to the charge determining unit to automatically increase a speed of the engine from an initial engine speed to an increased engine speed when the charge determining unit determines that the charge in the battery is less than the first predetermined value and the engine control unit determines that the engine is already running to thereby increase the electrical current provided to the battery. Preferably, the charge determining unit also determines whether the remaining charge of the battery is greater than a second predetermined value, and the engine control unit is responsive to the charge determining unit to automatically reduce the engine speed from the increased engine speed to the initial engine speed when the charge determining unit determines that the charge in the battery is greater than the second predetermined value and the engine speed was increased by the engine control unit. The engine control unit is further responsive to the charge determining unit to automatically stop the engine when the charge determining unit determines that the charge in the battery is greater than the second predetermined value and the engine was automatically started by the engine control unit. Also preferably, the watercraft battery monitoring system further comprises an input unit that receives an input by an operator to set or reset an automatic engine start enable command and that receives an input to set or reset an automatic speed control enable command. A storage unit receives the inputs and stores a value representing whether automatic engine start enable command is set or reset and stores a value representing whether the automatic speed control enable command is set or reset. The engine control unit is responsive to the value representing the automatic start enable command in the storage unit to automatically start the engine only when the automatic start enable command is set. The engine control unit is further responsive to the value representing the automatic speed control enable command in the storage unit to automatically increase the speed of the engine only when the automatic speed control enable command is set.

Another aspect in accordance with embodiments of the present invention is a method of maintaining a charge in watercraft battery. The method comprises integrating the current extracted from a battery and the current provided to a battery to provide a net integrated current value; determining from the net integrated current value whether a remaining charge in the battery is less than a predetermined value; and outputting a perceptible alarm when the remaining charge in the battery is less than the predetermined value. Preferably, the perceptible alarm is visual, audible or both visual and audible.

Another aspect in accordance with embodiments of the present invention is a method of maintaining a charge in watercraft battery. The method comprises integrating the current extracted from a battery and the current provided to a battery to provide a net integrated current value; determining from the net integrated current value whether a remaining charge in the battery is less than a predetermined value; and automatically starting an engine when the charge in the battery is less than the first predetermined value. The engine is coupled to a generator that provides electrical current to charge the battery to a charge level greater than the first predetermined value. Preferably, the method further comprises determining whether the remaining charge of the battery is greater than a second predetermined value, and automatically stopping the engine when the charge in the battery is greater than the second predetermined value. In particularly preferred embodiments, the method further comprises receiving an input by an operator to set or reset an automatic start enable command and storing a value representing whether the automatic start enable command is set or reset. The method automatically starts the engine only when the stored value represents the automatic start enable command being set.

Another aspect in accordance with embodiments of the present invention is a method of maintaining a charge in watercraft battery. The method comprises integrating the current extracted from a battery and the current provided to a battery to provide a net integrated current value; determining from the net integrated current value whether a remaining charge in the battery is less than a predetermined value; and automatically increasing a speed of engine from an initial engine speed to an increased engine speed when the charge in the battery is less than the first predetermined value. The engine is coupled to a generator that provides electrical current to charge the battery to a charge level greater than the first predetermined value. Preferably, the method further comprises determining whether the remaining charge of the battery is greater than a second predetermined value; and automatically decreasing the engine speed from the increased engine speed to the initial engine speed when the charge in the battery is greater than the second predetermined value. In particularly preferred embodiments, the method further comprises receiving an input by an operator to set or reset an automatic speed control enable command and storing a value representing whether the automatic speed control enable command is set or reset. The method automatically increases the speed of the engine only when the stored value represents the automatic speed control enable command being set.

Another aspect in accordance with embodiments of the present invention is a method of maintaining a charge in a watercraft battery. The method comprises integrating the current extracted from a battery and the current provided to a battery to provide a net integrated current value; determining from the net integrated current value whether a remaining charge in the battery is less than a predetermined value; and performing at least one of (1) automatically starting an engine when the charge in the battery is less than the first predetermined value and the engine is stopped and (2) automatically increasing a speed of engine from an initial engine speed to an increased engine speed when the charge in the battery is less than the first predetermined value and the engine is already running. The engine is coupled to a generator that provides electrical current to charge the battery to a charge level greater than the first predetermined value. Preferably, the method further comprises determining whether the remaining charge of the battery is greater than a second predetermined value and performing at least one of (1) automatically decreasing the engine speed from the increased engine speed to the initial engine speed when the charge in the battery is greater than the second predetermined value and the engine speed was automatically increased from the initial engine speed to the increased engine speed and (2) automatically stopping the engine when the charge in the battery is greater than the second predetermined value and the engine was automatically started. In particularly preferred embodiments, the method further comprises receiving an input by an operator to set or reset an automatic start enable command and receiving an input by the operator to set or reset an automatic speed control enable command. The method stores a value representing whether the automatic start enable command is set or reset, and automatically starts the engine only when the stored value represents the automatic start enable command being set. The method stores a value representing whether the automatic speed control enable command is set or reset, and automatically increases the speed of the engine only when the stored value represents the automatic speed control enable command being set.

BRIEF DESCRIPTION OF THE DRAWINGS

Preferred embodiments in accordance with aspects of the present invention will be described below in connection with the accompanying drawing figures in which.

DETAILED DESCRIPTION OF THE PREFERRED EMBODIMENT

Figure 1:
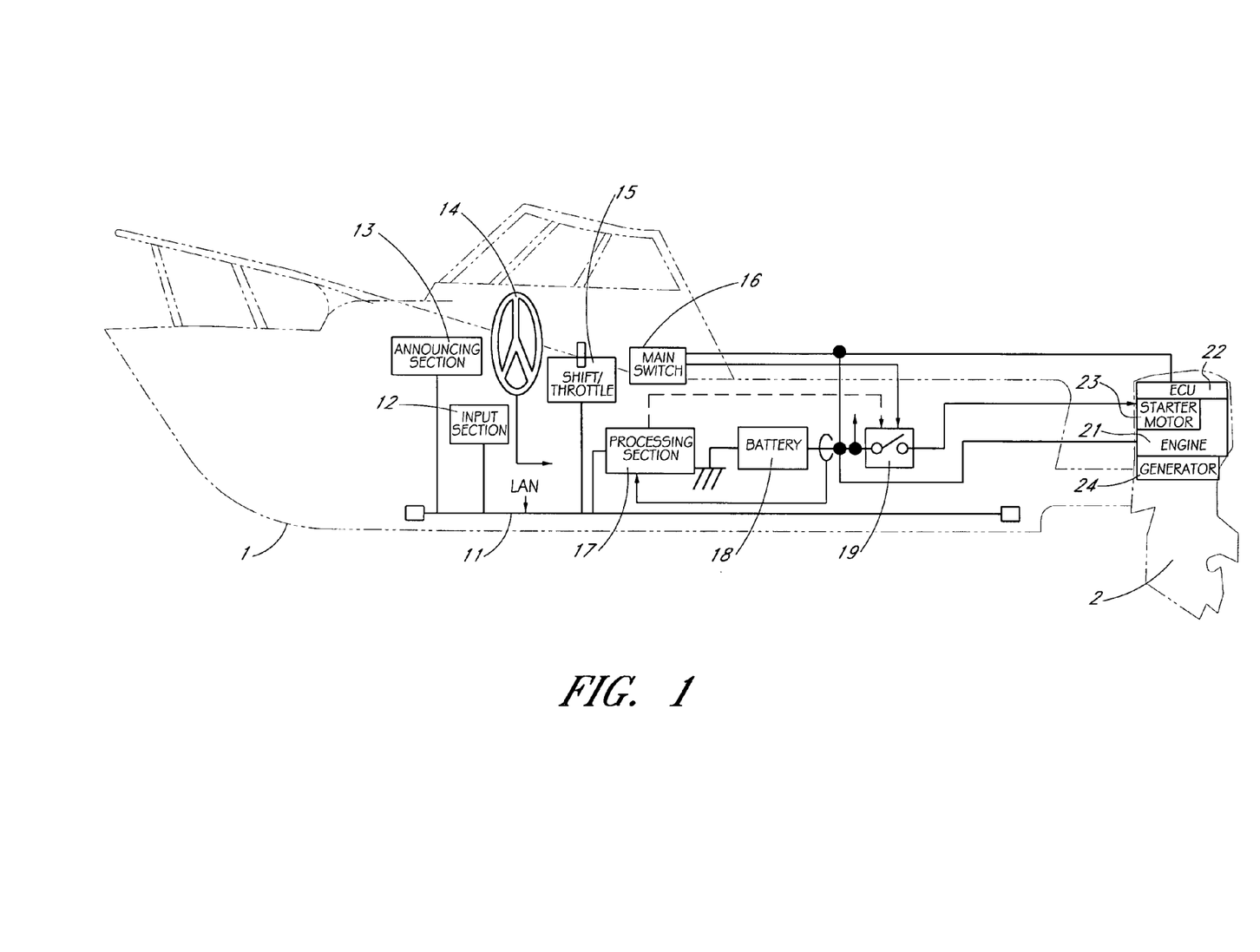
FIG. 1 illustrates a diagram of a watercraft in phantom with components of a battery control system and an engine control system illustrated by a block diagram.

FIG. 1 shows a watercraft equipped with a watercraft battery control system that comprises a battery consumption warning device and a system for maintaining a battery charge. In the illustrated embodiment, the watercraft battery maintenance system comprises a processing section 17 and an announcing section 13. Information is communicated between the processing section 17 and the announcing section 13 through a local area network (LAN) 11 provided in the watercraft. Known hardware standards and protocols can be used for the LAN 11. Direct connections can also be used between the two sections and between other sections described herein instead of using the LAN 11 to interconnect the sections.

As shown in FIG. 1, the watercraft comprises a hull 1 and an outboard motor 2. The LAN 11 is positioned in the hull 1 and is connected to an input section 12, the announcing section 13, a shift/throttle operating section 15, and the processing section 17. The outboard motor 2 includes an engine 21, which is provided with an engine control unit (ECU) 22, a starter motor 23, and a generator 24. The ECU 22 communicates with various watercraft components via the LAN 11.

The hull 1 also comprises a steering control (steering wheel) 14 for steering the outboard motor 2. The hull 1 also includes a main switch 16, a battery 18, and a starter relay 19. The main switch 16 generally starts or stops the engine 21 through a key (not shown). When the main switch 16 is closed, the starter relay 19 transfers a voltage from the battery 18 to activate the starter motor 23 to initiate engine operation. An engine stop switch 25 can cause the ECU 22 to cease engine operation. The watercraft may also include other systems for controlling when the engine is stopped, as is well known by persons skilled in the art.

The battery 18 also supplies power to other various watercraft components. The battery 18 is charged by the generator 24 mounted on the engine 21. The generator 24 delivers an AC output voltage to a rectifying circuit (not shown) to supply the battery 18 with a rectified DC input voltage.

The electrical current delivered to the battery and the electrical current supplied by the battery 18 are monitored by the processing section 17. The processing section 17 controls the operation of the starter relay 19 based on the result of the monitoring. For example, in one preferred embodiment, the processing section 17 outputs a signal to start and stop the engine 21 based on a measured battery current. The processing section 17 outputs a signal, such as a warning signal, via the LAN 11 to the announcing section 13 based on the result of monitoring the current delivered to and the current supplied by the battery 18. The announcing section 13 also advantageously informs the operator visually through a display or audibly through a warning sound.

The input section 12 can be in the form of an operational panel, a touch screen, a keyboard, or any input system through which information necessary for the processing by the processing section 17 can be inputted. The inputted information is supplied to the processing section 17 via the LAN 11. The processing section 17 can be advantageously placed within the input section 12 to allow the overall construction of the watercraft battery maintenance system to be smaller.

Figure 2:
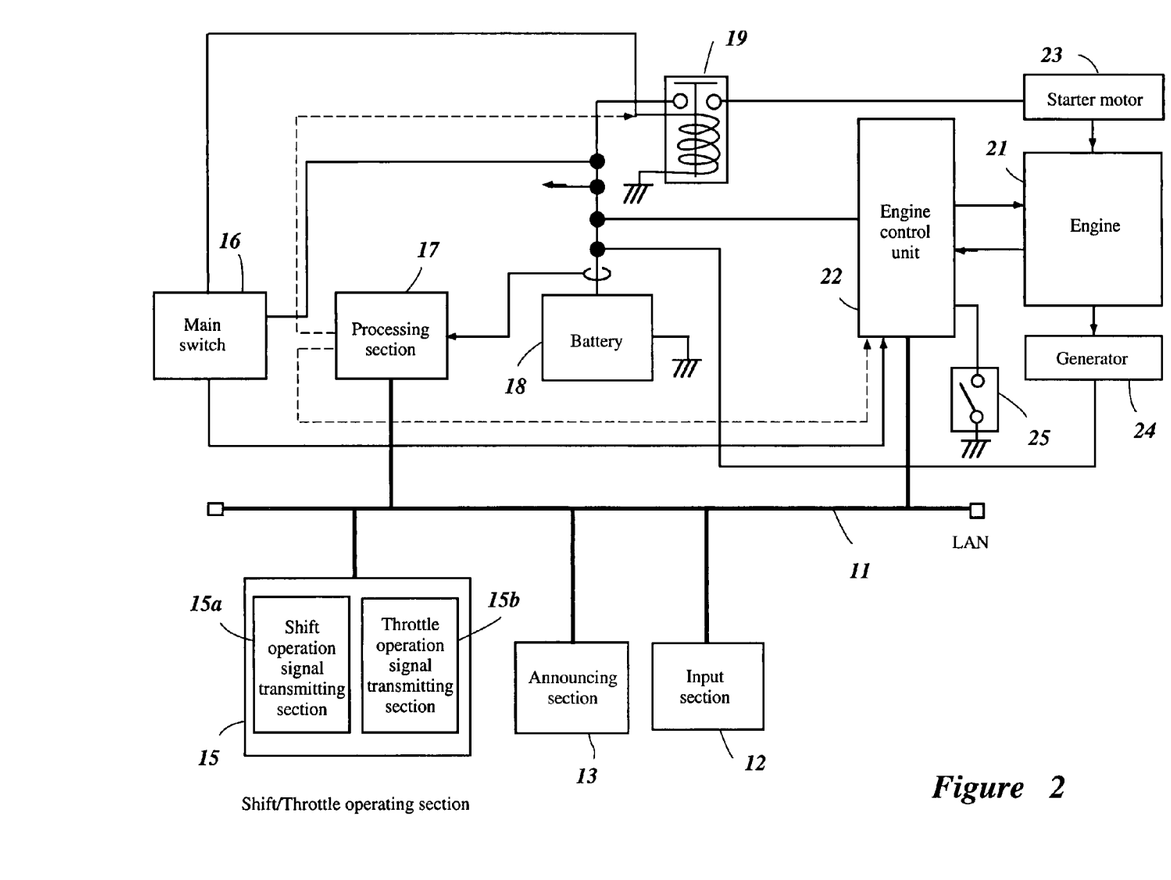
FIG. 2 illustrates a block diagram of a watercraft battery control system showing battery monitoring components and engine components.

FIG. 2 illustrates a more detailed block diagram of a preferred embodiment of a watercraft battery control system in combination with watercraft and engine components.

The shift/throttle operating section 15 operates a transmission (not shown) to shift the transmission to either a forward, reverse, or neutral position in response to movement of a shift/throttle lever or other shift/throttle control selector. The shift throttle operating section 15 also operates an engine throttle position in response to operator's torque request. For example, moving the shift/throttle lever in a predetermined direction translates an operator's torque request to a torque request electrical signal based on the angle of the lever. The shift/throttle operating section 15 communicates the torque request signal and a transmission request signal to the ECU 22 via the LAN 11.

The shift/throttle operating section 15 includes a shift operation signal transmitting section 15a and a throttle operation signal transmitting section 15b. The shift operation signal transmitting section 15a delivers the transmission request signal corresponding to a shift/throttle lever position to the ECU 22 via the LAN 11. The throttle operation signal transmitting section 15b delivers the torque request signal to the ECU 22 via the LAN 11. Although both signals originate within the shift/throttle operating section, the ECU 22 recognizes each signal as a distinct signal that is delivered to the ECU 22 via the LAN 11.

The ECU 22 controls the transmission position and throttle position of the engine 21 based on the electrical signals representative of the operator's requests. The ECU 22 communicates with the announcing section 13 to inform the operator of various engine and watercraft condition values. For example, the ECU 22 informs the operator of watercraft speed, engine speed, transmission position, and battery condition. Other engine and watercraft component information can also be communicated to the operator via the announcing section, as understood by a person skilled in the art. The announcing section 13 advantageously visually displays the transmitted information or advantageously sounds an audible alarm to inform the operator of watercraft condition. Alternatively both the visual display and the audible alarm can be activated.

In the illustrated embodiment, the processing section 17 advantageously comprises a general-purpose computer (e.g., a microprocessor-based computer system); however the processing section 17 may also advantageously comprise an application specific device that implements functions directed to the watercraft battery control system described herein.

In one preferred embodiment, the engine 21 can be stopped in response to a control signal from the main switch 16. In another embodiment, the engine 21 can be stopped by an engine stop switch 25. Alternatively, either switch can be used to stop the engine 21. The ECU 22 can also stop the engine in response to battery conditions monitored by the processing section 17. For example, when the current received by the battery 18 from the generator 24 or when the current delivered to the watercraft and engine components from the battery 18 exceeds a predetermined amount, the ECU 22 can stop the engine 11 to protect the battery 18 and the watercraft and engine components from possible damage.

A high voltage ignition system (not shown) provides ignition of an air/fuel mixture through a plurality of spark plugs (not shown). The ignition system can be advantageously controlled directly from the ECU 22 to initiate the spark plugs at predetermined ignition timing points with reference to a crankshaft angle. The ignition system can be deactivated by the ECU 22 when the ECU 22 receives an engine stop signal from the main switch 16 or from the manual engine stop switch 25. The ECU 22 can also deactivate the ignition when the ECU 22 receives an engine stop signal from the processing section 17. When the ECU 22 deactivates the ignition, the spark plugs are no longer initiated and the air/fuel mixture is not ignited, to thereby stop the engine 21.

High voltage ignition systems are familiar to persons skilled in the art. Therefore, further explanations of various components of the ignition system, such as, for example, an ignition coil or a triggering circuit of the ignition system are not necessary.

In one preferred embodiment, the watercraft battery control system advantageously operates as a battery consumption warning device if the battery 18 is being overcharged or undercharged or if the battery 18 is delivering an inadequate current. Dashed signal lines in FIG. 2 represent signals that can be advantageously used to initiate the starter relay or to send an engine stop signal to the ECU 22 when the watercraft battery control system monitors battery operations and controls battery consumption. When the watercraft battery control system is used only as a battery consumption-warning device, the dashed signal lines can be omitted.

Figure 3:
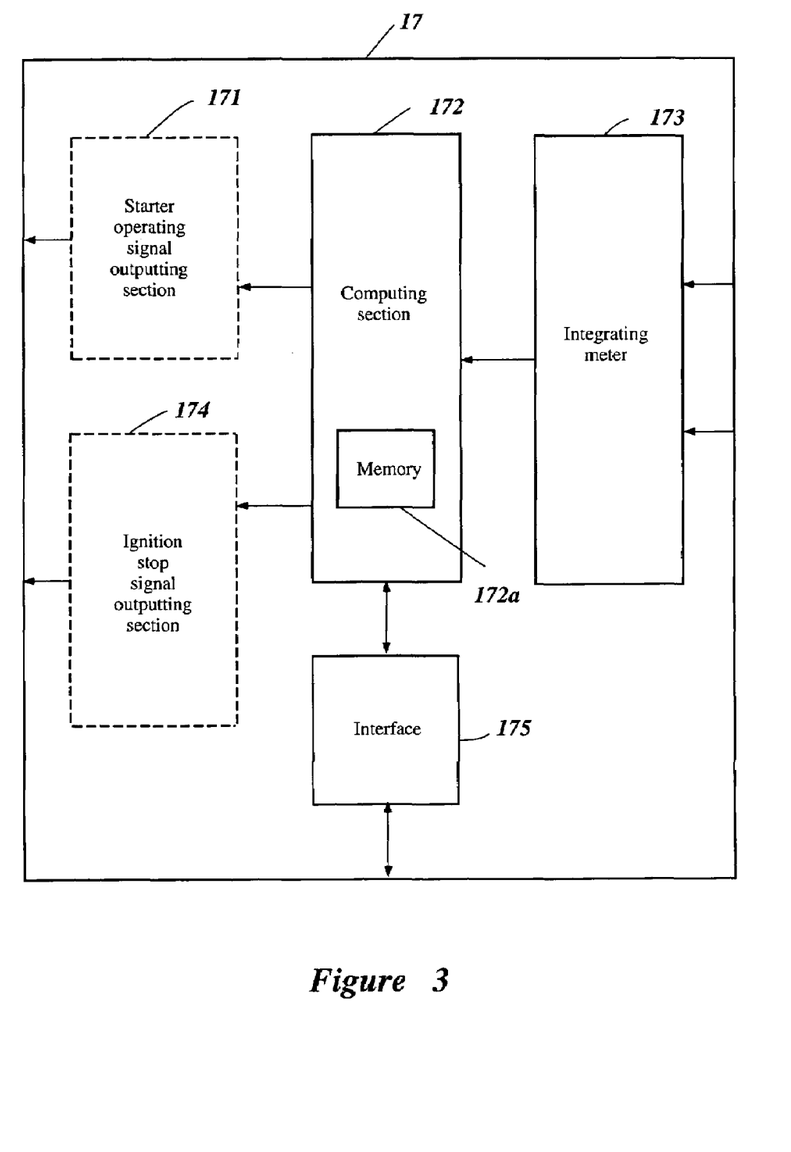
FIG. 3 illustrates a block diagram illustrating various communication paths and components of a watercraft battery control system.

FIG. 3 illustrates exemplary components inside the processing section 17. The processing section 17 comprises an integrating section 173, a computing section 172, a starter operating signal outputting section 171, an ignition stop signal outputting section 174, and an interface 175. The computing section 172 includes a memory 172a.

The integrating section 173 monitors the electrical current delivered from the battery 18 to the watercraft and engine components and also monitors the electrical current delivered to the battery 18 from the generator 24. The integrating section 173 integrates the current delivered from the battery to various watercraft and engine components (e.g., the battery output current) and advantageously represents the integrated value of the battery output current as a positive value. The integrating section 173 integrates the current delivered to the battery 18 from the generator 24 (e.g., the battery input current) and advantageously represents the integrated value of the battery input current as a negative value. The integrated positive and negative values are used to determine a net integrated current value for the battery 18 wherein a net positive value indicated that more current was output from the battery than was input to the battery during an integration interval. The net integrated current value is delivered to the computing section 172.

The integrating section 173 advantageously comprises an ammeter (not shown) that is configured to measure both positive current values and negative current values. The ammeter is connected so that the ammeter measures the net current flowing from the battery 18. An analog-to-digital converter (not shown) converts the measured analog current value from the ammeter to a digital value. The converted digital current value is sampled and delivered to the computing section 172.

The computing section 172, which can also be referred to as a "charge determining unit", receives the information stored in the memory 172a, the information outputted from the integrating section 173 and the information obtained from the LAN 11 via the interface 175. The computing section 172 performs logical operations on the received information to generate processed information. The computing section 172 outputs commands responsive to the processed information to the starter operating signal outputting section 171, to the ignition stop signal outputting section 174, and to the interface 175.

The starter operating signal outputting section 171 is responsive to a command output from the processing section 172 to selectively output a signal to activate the starter relay 19. The ignition stop signal outputting section 174 is responsive to a command output from the processing section 172 to selectively output a signal to deactivate the actuation of the ignition control circuit in the ECU 22. The interface 175 comprises a communication interface for the processing section 17 to enable the processing section 17 to exchange processed information with watercraft components and engine components via the LAN 11.

It should be understood that the components of the battery control system necessary for the low battery charge warning, such as the processing section 17, are advantageously powered at all times, even when the boat is anchored with the engine 18 stopped.

Figure 4:
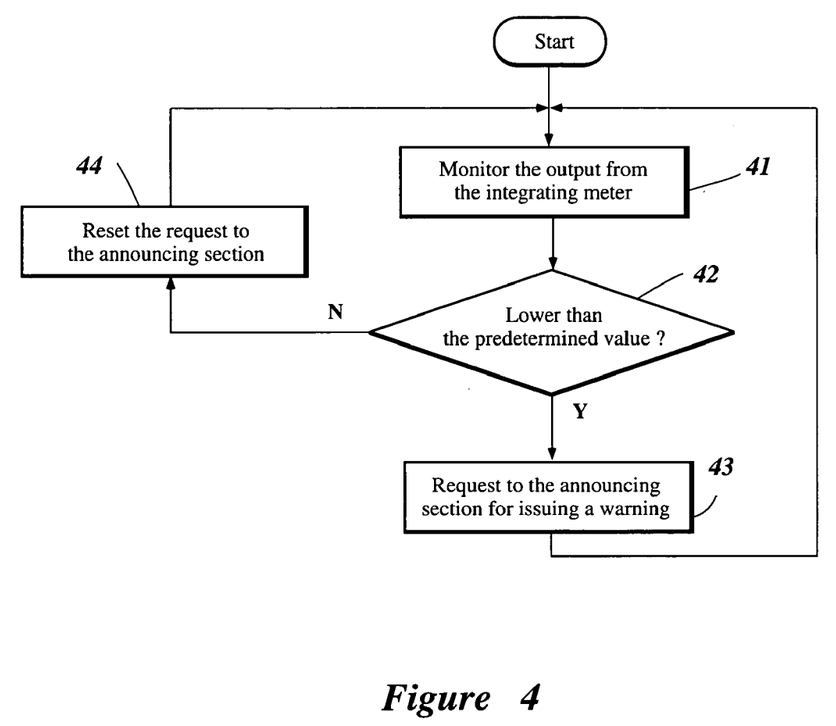
FIG. 4 illustrates a flowchart of a control routine performed by the watercraft battery control system that illustrates control of a battery alarm.

FIG. 4 illustrates a flowchart that represents the operation of a control routine of the watercraft battery control system illustrated in FIGS. 1–3. The control begins and advances to an operation block 41, wherein the computing section 172 monitors the net integrated current value output from the integrating section 173. As discussed above, the net integrated current value produced by the integrating section 173 represents the remaining charge in the battery 18.

The control routine then advances to a decision block 42, wherein the control routine determines whether the net integrated current value output from the integrating section 173 is lower than a predetermined value. If the integrated value from the integrating section 173 is lower than the predetermined value, the control routine advances to an operation block 43. If the net integrated current value is not lower than the predetermined value (e.g., is equal to or greater than the predetermined value), the control routine advances to an operation block 44.

In the operation block 43, the control routine requests the announcing section 13 to issue a warning to inform the operator that the remaining battery charge is lower than the predetermined value. Thus, the operator is made aware that allowing the battery 18 to continue to discharge may reduce the remaining charge below the charge needed to start the engine 21. The control routine then returns to the beginning to repeat the foregoing steps.

In the operation block 44, the control routine resets the request to the announcing section 13 to issue a warning to the operator. The control routine then returns to the beginning to repeat the foregoing steps.

The control routine illustrated in FIG. 4 causes the computing section 172 to monitor the output of the integrating section 173. The computing section 172 determines whether the remaining charge of the battery 18 is less than a predetermined value. Since, as discussed above, the output from the integrating section 173 indicates the net integrated current consumed from the battery 18, the computing section 172 can determine how much charge is left in the battery 18 by taking into account the capacity of the battery 18.

The amount of charge needed during normal engine starting is set as the predetermined battery charge value. The remaining charge of the battery is calculated by the computing section 172 from the output of the integrating section 173 and from the capacity of the battery 18. The capacity of the battery 18 and the predetermined battery charge needed to start the engine are values that may vary with different models of batteries and with different sizes of engines. The capacity and the predetermined battery charge for the particular combination of battery and engine are advantageously inputted through the input section 12 and stored in the memory 172a.

When the remaining charge of the battery 18 is determined to be less than the predetermined value, the signal is outputted to the announcing section 13 through the LAN 11 to output a warning, as described above for the operation block 43. Because the control routine repeats, the outputted warning continues until the remaining charge of the battery 18 is determined to be as great as the predetermined value in the decision block 42. When the change in the charge determination occurs (e.g., when the remaining charge of the battery 18 is determined not to be lower than the predetermined value in the decision block 42), the request to the announcing section 13 for generating the warning is reset in the operation block 44, as described above.

The initiated warning causes the operator to become aware of the shortage of remaining battery charge. The operator advantageously responds to the warning and starts the engine 21 to begin charging the battery 18. Charging the battery 18 is intended to prevent the remaining charge of the battery 18 to fall further below the predetermined value such that the battery 18 would have an insufficient charge to start the engine 21. When the warning is no longer occurring, the operator may then turn of the engine 21.

Figure 5:
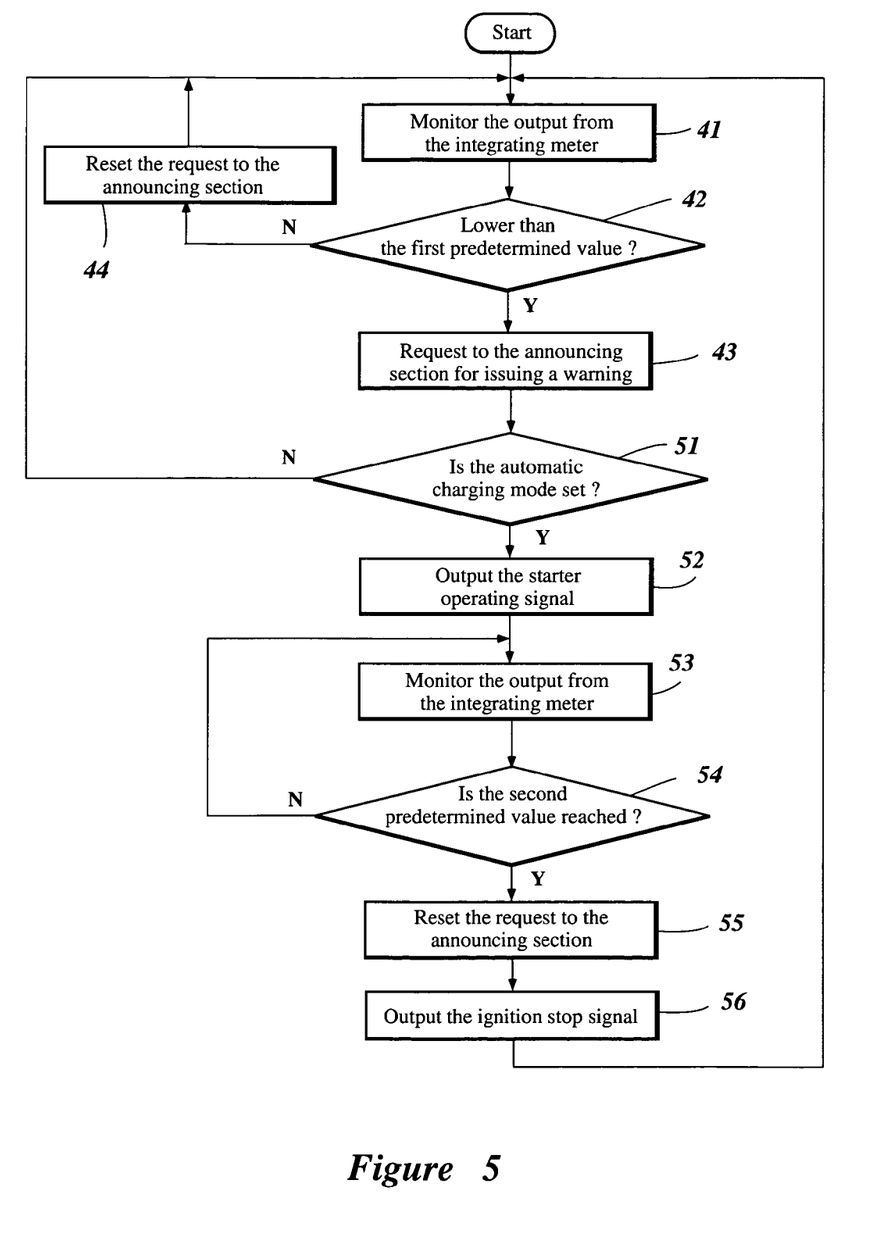
FIG. 5 illustrates a flowchart of a control routine performed by the watercraft battery control system that illustrates control of an automatic starting mode.

A flowchart in FIG. 5 is similar to the flowchart in FIG. 4, and similar operation blocks and decision blocks are identified accordingly. The flowchart in FIG. 5 includes additional control routine procedures to implement another aspect of the watercraft battery control system illustrated in FIGS. 1–3.

In FIG. 5, the control routine begins and advances to the operation block 41, wherein the output from the integrating section 173 is monitored by the computing section 172, as discussed above. The control routine then advances to the decision block 41, wherein the control routine determines whether the net integrated current value from the integrating section 173 is lower than a first predetermined value. If the net integrated current value is lower than the first predetermined value, the control routine advances to the operation block 43. If the net integrated current value is not lower than the first predetermined value, the control routine advances to the operation block 44.

In the operation block 43, the control routine requests the announcing section 13 to issue a warning to inform the operator that the remaining charge in the battery 18 is lower than the first predetermined value as described above in connection with FIG. 4. The control routine then advances to a decision block 51.

As discussed above, in the operation block 44, the control routine resets the request to the announcing section 13 to issue a warning to the operator as described above in connection with FIG. 4. The control routine then returns to the beginning to repeat the foregoing steps.

In the decision block 51, the control routine determines whether an automatic charging mode is set. If the automatic charging mode is not set, then the control routine returns to the beginning to repeat the foregoing steps. If the automatic charging mode is set, the control routine advances to an operation block 52.

In the operation block 52, the control routine outputs a starter operating signal which initiates the starter relay 19 to start the engine 21. Then, the control routine advances to an operation block 53.

In the operation block 53, the computing section 172 monitors the net integrated current value that is output from the integrating section 173. As discussed above, the net integrated current value represents the amount of remaining battery charge. The control routine then advances to a decision block 54.

In the decision block 54, the control routine determines whether the net integrated current value has reached a second predetermined value. If a second predetermined value has not been reached the control routine returns to the operation block 53. The control routine repeats the operation in the block 53 and the decision process in the block 54 until the second predetermined value is reached. When the second predetermined value is reached, the control routine advances to an operation block 55.

In the operation block 55 the control routine resets the request to the announcing section 13. The control routine then advances to an operation block 56.

In the operation block 56, the control routine outputs an ignition stop signal to cause the computing section 172 to issue a command to the ignition stop signal outputting section 174. The stop signal outputting section 174 responds to the command to generate the ignition stop signal, which deactivates the ignition power supply circuit of the ECU 22 is thereby deactivated to stop the engine 21. The control routine then returns to the beginning to repeat the foregoing steps.

As discussed above, the automatic charging mode automatically starts the engine 21 when a predetermined battery charge is detected in the processing section 17. No action by the operator is required when the battery control system is in the automatic charging mode. The automatic charging mode can be selectably set by the operator via the input section 12. Alternatively, the automatic charging mode can be fixedly (unrewritably) stored in the memory 172a, which results in the automatic starting of the engine 21 automatically at all times when the remaining charge of the battery 18 decreases below the first predetermined level.

When the automatic charging mode is set, the computing section 172 produces the output to the starter operating signal outputting section 171 to deliver the starter operating signal. The starter-operating signal outputting section 171 accordingly delivers the starter-operating signal to the starter relay 19 to start the engine 21.

Preferably, when the engine 21 is automatically started as discussed above, the shift state of the engine 21 is in neutral and the throttle is opened to a degree sufficient to cause the engine 21 to operate at a speed that drives the generator 24 with enough power to output the electrical current required to charge the battery 18. To accomplish the foregoing, the processing section 17 issues a command to the ECU 22 via the LAN 11. The ECU 22 is advantageously programmed to automatically generate a shift operation signal to the transmission via the shift operation signal transmitting section 15a to cause the transmission to shift into the neutral position and to automatically generate a throttle opening command via the throttle operation signal transmitting section 15b to cause the engine 21 to operate at a sufficient speed to adequately charge the battery 18. Alternatively, the ECU 22 may be advantageously programmed to cause the engine 21 to be in the neutral position and to have an appropriate throttle opening whenever the engine 21 is shut off.

In above-described embodiment, when the remaining charge of the battery is determined to be less than the first predetermined value, the starter operating signal is outputted to start the engine 21. The engine 21 is thus started, and the charging of the battery 18 is initiated by the generator 24 attached to the engine 21. The first predetermined value is selected so that the battery 18 will have a sufficient charge to start the engine 21 when the automatic starting operation is initiated. The charging of the battery 18 to the second predetermined value causes the battery 18 to have a sufficient charge to operate the electrical components of the watercraft for a time interval before the engine 21 needs to be started again. The second predetermined value can be selected based on the power requirements of the components and based on a desired time interval before again starting the engine 21.

In an alternative to the embodiment of FIG. 5, either the engine start operation in the operation block 52 or the engine stop operation in the operation block 56 may be performed manually by the operator.

Figure 6:
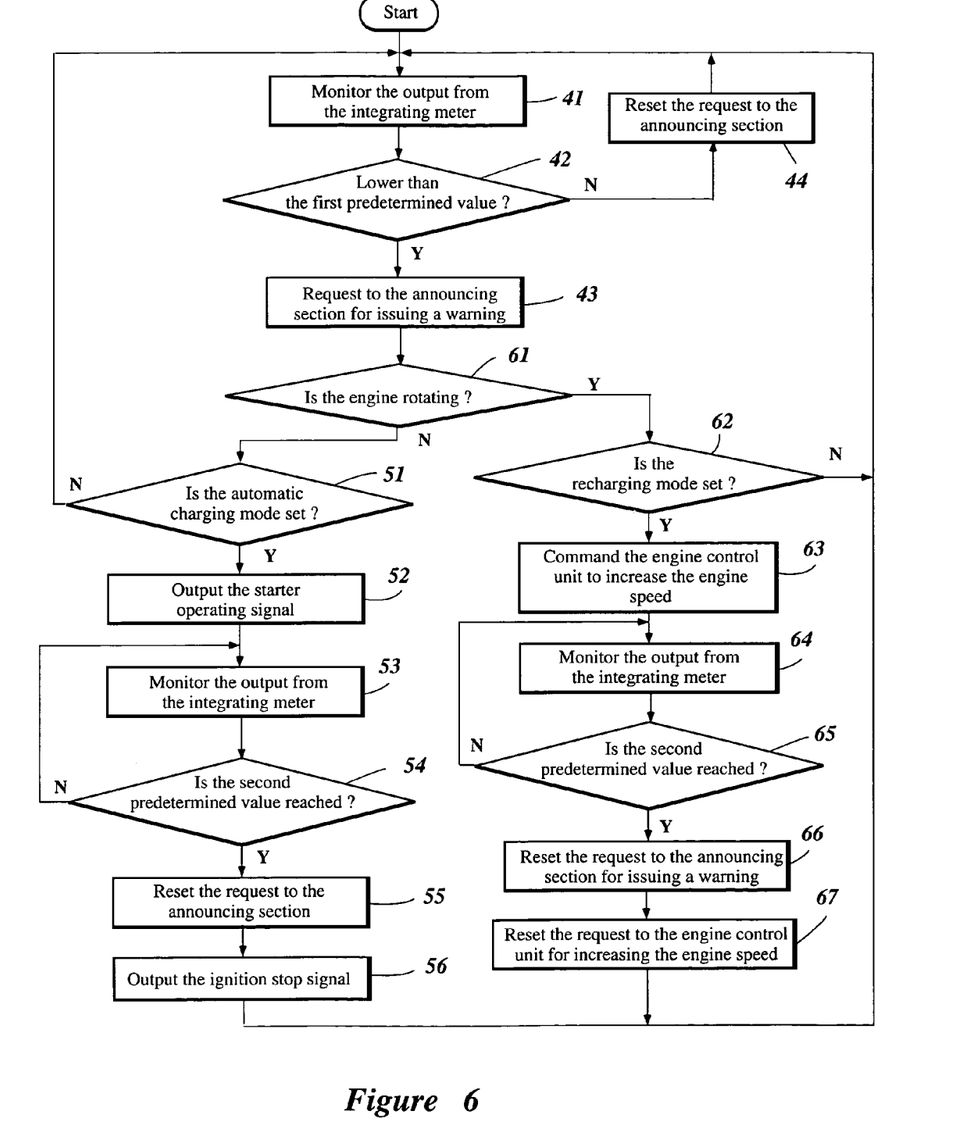
FIG. 6 illustrates a flowchart of a control routine performed by the watercraft battery control system that illustrates control of a recharging mode.

Another alternative embodiment of the control routines of FIGS. 4 and 5 is illustrated by a flowchart in FIG. 6. FIG. 6 includes the procedure described above, and similar operation blocks and decision blocks are identified accordingly. The flowchart in FIG. 6 includes additional control routine procedures to implement another aspect of the watercraft battery control system illustrated in FIGS. 1–3.

The control routine in FIG. 6 begins and advances to the operation block 41 where the net integrated current value output from the integrating section 173 is monitored by the computing section 172. The control routine then advances to the decision block 42, wherein the control routine determines whether the net integrated current value from the integrating section 173 is lower than a first predetermined value. If the net integrated current value is lower than the first predetermined value, the control routine advances to the operation block 43. If the net integrated current value is not lower than the first predetermined value, the control routine advances to the operation block 44.

In the operation block 43, the control routine requests the announcing section 13 to issue a warning to inform the operator that the remaining charge in the battery 18 is lower than the first predetermined value, as described above in connection with FIGS. 4 and 5. The control routine then advances to a decision block 61.

As discussed above, in the operation block 44, the control routine resets the request to the announcing section 13 to issue a warning to the operator, as described above in connection with FIGS. 4 and 5. The control routine then returns to the beginning to repeat the foregoing steps.

In the decision block 61, the control routine determines whether the engine 21 is already running. If the engine 21 is not running, the control routine advances to the operation block 51 and performs the operations in the blocks 51–56 described above in connection with FIG. 5. After completing the operations in the blocks 51–56, the control routine returns to the beginning and repeats the foregoing steps.

If the engine 21 is already running when the determination is performed in the decision block 61, the control routine advances to a decision block 62, wherein the control routine determines whether the recharging mode is set. If the recharging mode is not set, the control routine returns to the beginning and repeats the foregoing steps. If the recharging mode is set, the control routine advances to an operation block 63.

In the operation block 63, the control routine commands to the ECU 22 to cause the ECU 22 to generate signals to increase the engine speed. The control routine then advances to an operation block 64.

In the operation block 64, the computing section 172 monitors the net integrated current value output from the integrating section 173, which represents the amount of remaining battery charge. The control routine then advances to a decision block 65, wherein the control routine determines whether the net integrated current value has reached a second predetermined value. If the net integrated current value has not reached the second predetermined value, the control routine returns to the operation block 64. If the net integrated current value has reached the second predetermined value, the control routine advances to an operation block 66.

In the operation block 66, the control routine resets the request to the announcing section for issuing a warning to cause the warning to the operator to be discontinued. The control routine then advances to an operation block 67.

In the operation block 67, the control routine resets the request to the ECU 22 for increasing the engine speed. The control routine then returns to the beginning and repeats the foregoing steps.

In accordance with the embodiment of FIG. 6, when the signal is outputted to the announcing section 13 to output the warning, the processing branches according to whether the engine 21 is running or not. The running condition of the engine 21 can be detected by the ECU 22 through the LAN 11 and the interface 175 to the computing section 172.

The recharging mode is a mode that can be set via the input section 12 and stored in the memory 172a. When the recharging mode is set and the engine is already running when the remaining charge of the battery 18 decreases below the first predetermined value, the speed of the engine 21 is automatically increased to increase the current generated by the generator 24. In particular, although power is already being generated by the generator 24, if the amount of charge in the battery 18 decreases below the first predetermined value, more power is being consumed by the electrical components of the watercraft than is being provided by the generator 24 at the original speed of the engine 21.

When the recharging mode is set, the computing section 172 issues a command signal to the ECU 22 via the interface 175 and the LAN 11 to cause the ECU 22 to generate control signals to increase the speed of the engine 21. In particular, the ECU 22 advantageously outputs a control signal to increase the throttle opening of the engine 21 to cause speed of the engine 21 to increase.

After the speed of the engine 21 is automatically increased, the output from the integrating section 173 is continually monitored by repeating the operations in the blocks 64 and 65 until a determination is made that the remaining charge of the battery 18 has reached the second predetermined value. As discussed above, the second predetermined battery charge value is set beforehand to be sufficiently larger than the first predetermined value so that the battery 18 has enough charge to supply power to the electrical components of the watercraft for a time interval when the engine 21 is not running and to have a sufficiently large remaining charge to start the engine 21. The second predetermined value is advantageously inputted via the input section 12 and is stored in the memory 172a.

When the second predetermined value is reached, the request to the announcing section 13 for generating the warning is reset and the reset of the request for increasing the engine speed is outputted. The computing section 172 issues a command to the ECU 22 via the interface 175 and the LAN 11 to cause the ECU 22 to reset the request for increasing the engine speed, which causes results in the speed of the engine 21 to return to the initial value (e.g., a selected idle speed).

The above-described embodiment of FIG. 6 ensures that a sufficient charge is maintained in the battery 18 when the power is being consumed faster than the battery 18 can supply when being charged at an initial idle speed of the engine 21.

Figure 7:
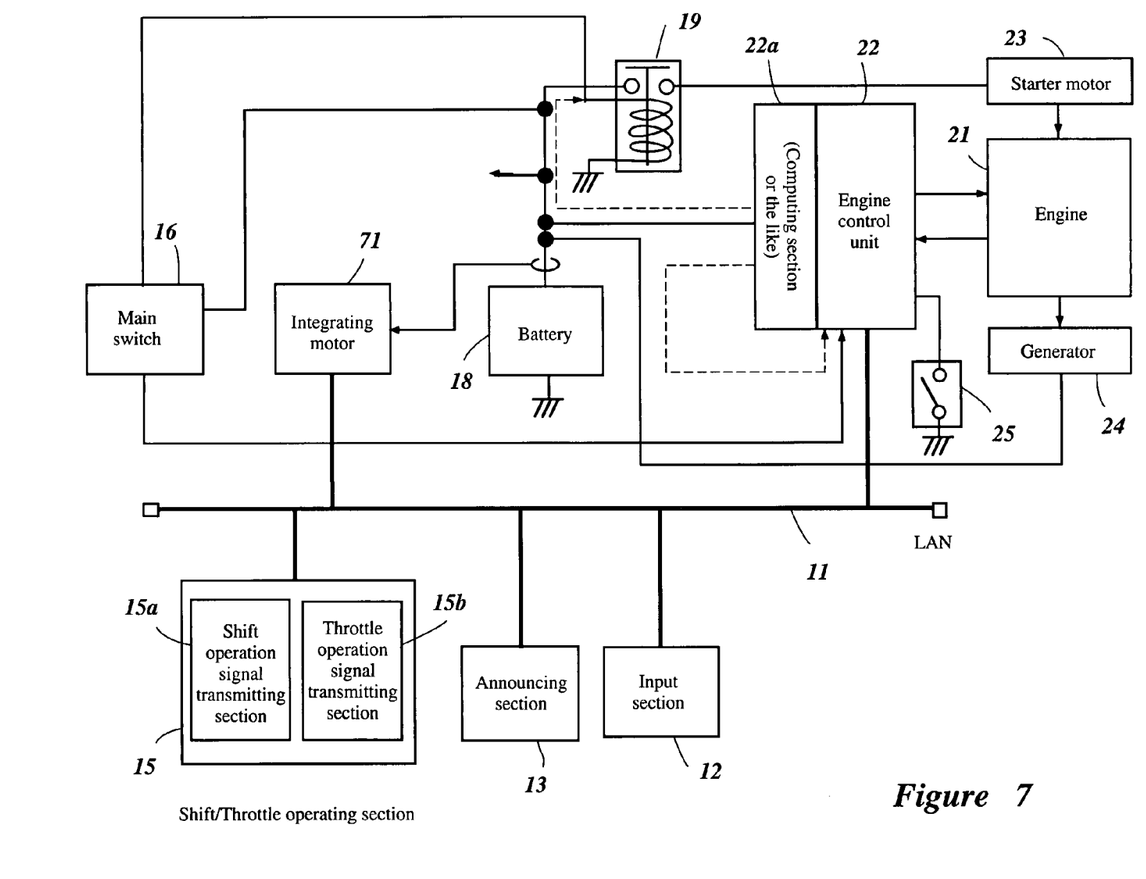
FIG. 7 illustrates a block diagram of a watercraft battery control system showing battery monitoring components and engine components placed in a predetermined location near an electronic control unit.

FIG. 7 illustrates another embodiment of a watercraft battery control system in accordance with another aspect of the present invention. In the embodiment of FIG. 7, the integrating section 71 communicates with the LAN 11 and replaces the processing section 17 of FIG. 2. The integrating section 71 has the same function as of the integrating section 173 of the processing section 17 in the previously described embodiment and is provided with the communication interface (not shown in FIG. 7) to enable the integrating section 17 to be connected to the LAN 11. Furthermore, in the embodiment of FIG. 7, the computing section 172, the starter operating signal outputting section 171, and the ignition stop signal outputting section 174 are incorporated with the ECU 22 as a computing section 22a. Thus, a redundancy of hardware can be avoided by replacing the computing section 172 with a computing function found in the ECU 22.

Although, the locations of the computing sections and integrating section 71 in FIG. 7 differ from the locations of corresponding sections in FIG. 2, the overall operation of the watercraft battery control system in FIG. 7 is similar to the overall operation of the watercraft battery control system in FIG. 2. Therefore, the operations performed by the control routines in FIGS. 4–6 can also be implemented in the embodiment of FIG. 7.

Figure 8:
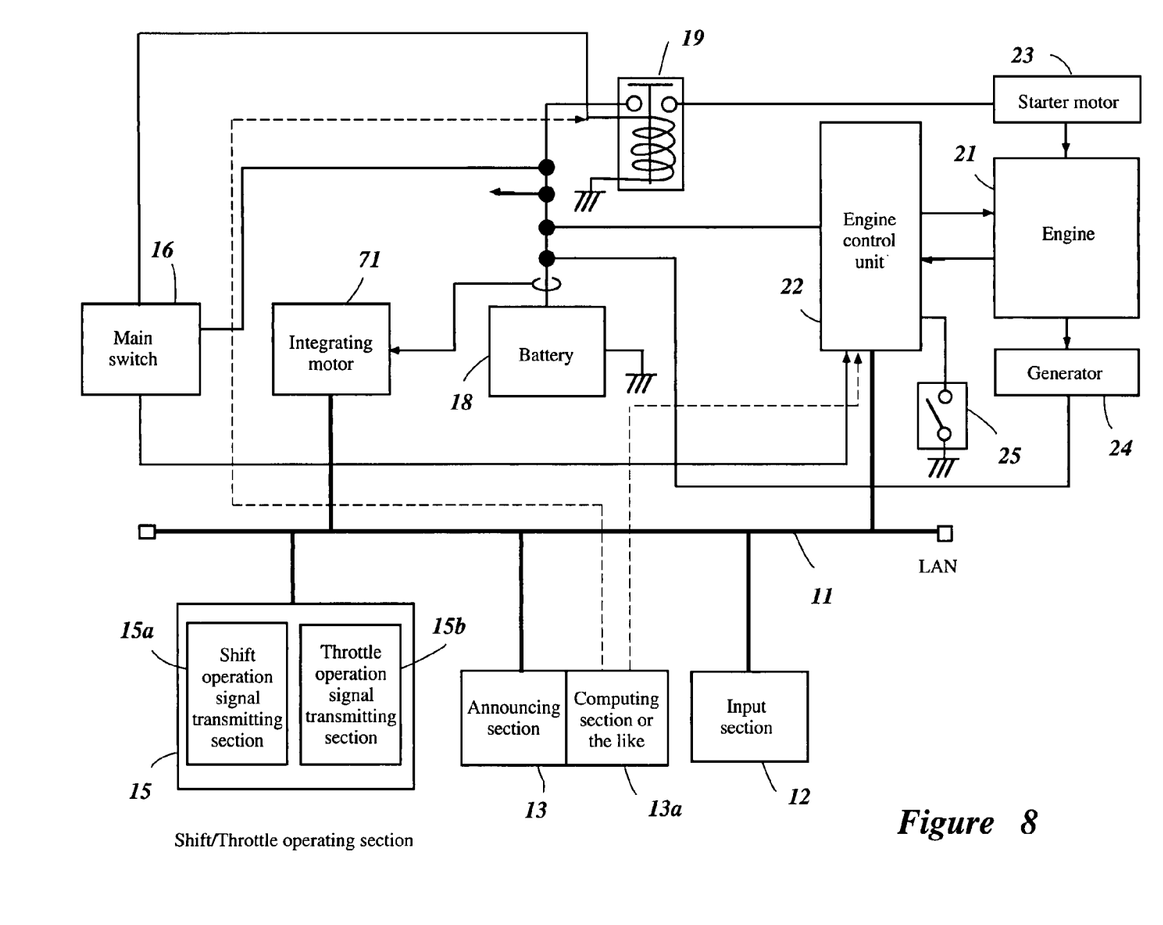
FIG. 8 illustrates a block diagram of a watercraft battery control system showing battery monitoring components and engine components placed in a predetermined location near an announcing section.

FIG. 8 illustrates another embodiment of a watercraft battery control system in accordance with another aspect of the present invention. As in FIG. 7, the locations of the computing sections and integrating section 71 in FIG. 8 differ from the locations of corresponding sections in the embodiment of FIG. 2. In contrast to FIG. 7, the computing section 172, the starter operating signal outputting section 171, and the ignition stop signal outputting section 174 in FIG. 8 are incorporated with the announcing section 13 as a computing section 13a.

Although, the locations of the computing sections and integrating section 71 in FIG. 8 differ from the locations of corresponding sections in FIG. 2, the overall operation of the watercraft battery control system in FIG. 8 is similar to the overall operation of the watercraft battery control system in FIG. 2. Therefore, the operations performed by the control routines in FIGS. 4–6 can also be implemented in the embodiment of FIG. 8.

In the embodiments described herein, the battery control system function can provide additional functions of the announcing section 13, such as, for example, the display screen. As a further example, the input section 12 can be integrated with the announcing section 13.

According to the embodiments described herein, the power extracted from the battery 18 and the power provided to the battery 18 are monitored by integrating the flow rate of the electrical currents into and out of the battery 18 to determine the remaining charge of the battery 18. By continuously monitoring the remaining charge of the battery 18, deep discharge of the battery 18 below the charge required to start the engine 18 can be prevented.

Although the present invention has been described in terms of a certain preferred embodiments; other embodiments apparent to those of ordinary skill in the art also are within the scope of this invention. Thus, various changes and modifications may be made without departing from the spirit and scope of the invention. For instance, various steps within the routines may be combined, separated, or reordered. In addition, some of the indicators sensed (e.g., engine speed and throttle position) to determine certain operating conditions (e.g., rapid deceleration) can be replaced by other indicators of the same or similar operating conditions. Moreover, not all of the features, aspects and advantages are necessarily required to practice the present invention. Accordingly, the scope of the present invention is intended to be defined only by the claims that follow.

What is claimed is:

1. A marine propulsion system comprising:
   an engine configured to be supported by a hull of a watercraft and capable of mechanically powering a water propulsion device to propel the hull through the water;
   a generator coupled to the engine to provide power to a battery configured to provide power to a starter motor to initiate engine operation; and
   a battery monitoring system capable of replenishing a charge in the battery when the charge falls below a first predetermined value, the battery monitoring system including:
      an integrating unit that integrates current extracted from the battery and current provided to the battery to provide a signal indicative of a net integrated current value,
      a charge determining unit responsive to the signal indicative of the net integrated current value, the charge determining unit providing a first output signal when the charge in the battery has fallen below a first predetermined value, and
      an engine control unit responsive to at least the first output signal from the charge determining unit to automatically start the engine when the charge determining unit determines that the charge in the battery is less than the first predetermined value, wherein running the engine causes the generator to provide electrical current to charge the battery.

2. The marine propulsion system of claim 1, wherein the charge determining unit provides a second output signal when the charge in the battery has risen above a second predetermined value, and wherein the engine control unit is responsive to at least the second output signal from the charge determining unit to automatically stop the engine when the charge determining unit determines that the charge in the battery is greater than the second predetermined value.

3. The marine propulsion system of claim 1, wherein the charge determining unit communicates signals to the engine control unit via a local area network.

4. The marine propulsion system of claim 1, further comprising:
   an input unit that receives an input by an operator to set or reset an automatic start enable command; and
   a memory that receives the input and stores a value representing whether the automatic start enable command is set or reset,
   wherein the engine control unit automatically starts the engine in response to at least the first output signal from the charge determining unit only when the value represents that the automatic start enable command is set.

5. The marine propulsion system of claim 1, wherein the charge determining unit outputs an alarm signal when the charge in the battery is less than the first predetermined value, and wherein the alarm signal is configured to cause an alarm unit to output a perceptible alarm.

6. The marine propulsion system of claim 5, wherein the perceptible alarm comprises a visual alarm.

7. The marine propulsion system of claim 5, wherein the perceptible alarm comprises an audible alarm.

8. A method for maintaining a charge in a battery capable of powering a starter motor to initiate engine operation in watercraft, the method comprising:
   integrating current extracted from a battery to power one or more components of a watercraft;
   integrating current provided to a battery from a generator coupled to an engine mechanically powering a water propulsion device capable of propelling the watercraft through water;
   determining a net integrated current value representative of an amount of current extracted from and provided to the battery;
   determining from at least the net integrated current value whether a charge in the battery is less than a predetermined value; and
   transmitting an engine start signal to an engine control unit to cause the engine control unit to automatically start the engine when the charge in the battery is less than the first predetermined value, wherein running the engine causes the generator to provide electrical current to charge the battery.

9. The method of claim 8, further comprising:
   determining whether the charge in the battery is greater than a second predetermined value; and
   automatically stopping the engine when the charge in the battery is greater than the second predetermined value.

10. The method of claim 8, wherein the transmission of the engine start signal comprises transmitting via a local area network.

11. The method of claim 8, further comprising:
    receiving an input by an operator to set or reset an automatic start enable command; and
    storing a value representing whether the automatic start enable command is set or reset, and
    automatically starting the engine in response to the charge in the battery being less than the first predetermined value only when the stored value represents the automatic start enable command being set.

12. The method of claim 8, further comprising outputting a perceptible alarm when the charge in the battery is less than the first predetermined value.

13. The method of claim 12, wherein the perceptible alarm comprises a visual alarm.

14. The method of claim 12, wherein the perceptible alarm comprises an audible alarm.

15. A method of supplying charge to a battery in a watercraft to attempt to maintain sufficient charge in the battery to power a starter motor for initiating engine operation on an engine capable of mechanically powering a water propulsion system that propels the watercraft through water, the method comprising:
    determining when a charge in a battery of a watercraft is below a predetermined value;
    determining whether an engine capable of mechanically powering a water propulsion system that propels the watercraft through water is running;

when the engine is running and the charge is below a predetermined value, automatically increasing the rotation of the engine causing a generator coupled to the engine to supply a greater charge to the battery until the charge in the battery is above a predetermined second value; and when the engine is not running and the charge is below a predetermined value, automatically powering a starter motor causing the engine to start running and the generator to supply a charge to the battery, and automatically stopping the engine when the charge in the battery is above the predetermined second value.

16. The method of claim 15, further comprising outputting a perceptible alarm when the charge in the battery is less than the first predetermined value.

17. The method of claim 16, wherein the perceptible alarm comprises a visual alarm.

18. The method of claim 16, wherein the perceptible alarm comprises an audible alarm.

19. The method of claim 15, wherein the automatic increasing the engine rotation and the automatic powering the starter motor occurs only when an operator of the watercraft has set an automatic start enable command.

* * * * *

UNITED STATES PATENT AND TRADEMARK OFFICE
CERTIFICATE OF CORRECTION

PATENT NO. : 6,987,376 B2  Page 1 of 1
APPLICATION NO. : 10/273895
DATED : January 17, 2006
INVENTOR(S) : Isao Kanno It is certified that error appears in the above-identified patent and that said Letters Patent is hereby corrected as shown below:

In Sheet 7 of 8, Box 71, Figure 7, Line 2, please delete "motor" and insert -- section --, therefore.

In Sheet 7 of 8, Box 22a, Figure 7, Line 2, please delete "or the like".

In Sheet 8 of 8, Box 71, Figure 8, Line 2, please delete "motor" and insert -- section --, therefore.

In Sheet 8 of 8, Box 13a, Figure 8, Lines 2-3, after "section" please delete "or the like".

In Column 9, Line 26, after "control" please insert -- routine --.

In Column 10, Line 31, after "turn" please delete "of" and insert -- off --, therefore.

In Column 10, Line 43, please delete "41" and insert -- 42 --, therefore.

Signed and Sealed this

Nineteenth Day of June, 2007

JON W. DUDAS
*Director of the United States Patent and Trademark Office*